Oct. 21, 1952  P. R. LEE  2,615,108
SNAP-ACTING BIMETAL THERMOSTAT
Filed Sept. 19, 1947

WITNESSES:
E. H. Lutz
D. J. McCarty

INVENTOR
Paul R. Lee
BY R. J. Eisinger
ATTORNEY

Patented Oct. 21, 1952

2,615,108

UNITED STATES PATENT OFFICE 2,615,108

SNAP-ACTING BIMETAL THERMOSTAT

Paul R. Lee, Mansfield, Ohio, assignor to Westinghouse Electric Corporation, East Pittsburgh, Pa., a corporation of Pennsylvania Application September 19, 1947, Serial No. 774,949

10 Claims. (Cl. 200—139)

This application is a continuation-in-part of my application, Serial No. 705,083 filed October 23, 1946, now abandoned.

My invention relates to a snap-acting thermostat.

One object of my invention is to provide a snap-acting thermostat which effects, for a given temperature differential, greater separation of the contacts upon opening movement of the thermostat.

Another object of my invention is to provide a snap-acting thermostat which operates satisfactorily with a smaller temperature differential.

Another object is to provide a snap-acting thermostat having greater current interrupting capacity.

In accordance with my invention, I have provided a stop for engaging the temperature-responsive element or contact actuating member in the open position, which stop resiliently engages such element or member instead of forming a positive stop or abutment therefor. At the moment that such element or member snaps to open position, the force or stress tending to move the same to open position is at maximum, since such stress is developed by temperature change to effect the snap action. Such stress overcomes the spring force of the resilient stop and causes wide contact separation at such time. This stress decreases as the temperature changes in the opposite direction so that the spring force of said resilient stop serves to move said temperature-responsive element or said member in closing direction, so that it will snap to closed position at the desired temperature.

The invention may be utilized to provide greater current interrupting capacity for a given temperature differential. On the other hand, it may be utilized to provide a lower temperature differential, since the wider contact separation obtained upon opening movement permits adjustment of the resilient stop to provide a smaller gap at the moment of closing. Then again, it may be utilized, as in a preferred embodiment, to provide both of these results, each to a lesser degree; that is, a thermostat having somewhat greater contact separation and somewhat smaller temperature differential than a comparable thermostat having rigid stops.

These and other objects are effected by my invention as will be apparent from the following description and claims taken in connection with the accompanying drawings, forming a part of this application, in which:

Figure 1:
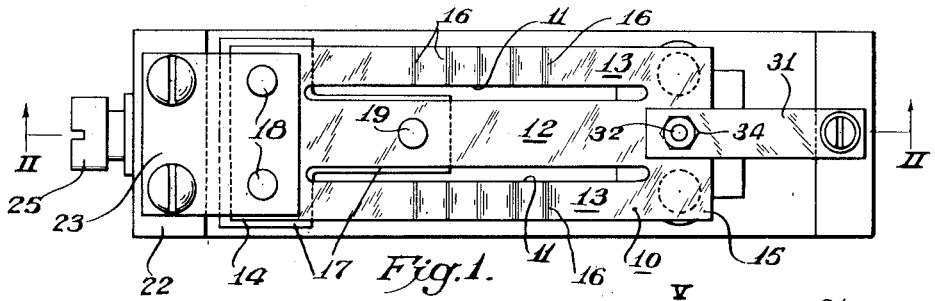
Fig. 1 is a plan view of a thermostat incorporating my invention.

In the illustrated embodiment, an inherently snap-acting bimetal element constitutes the contact actuating member, the temperature-responsive means and the snap-acting means. This element is shown in the present embodiment in the form of a strip 10, which is formed with two slots 11 dividing the strip into a center leg 12, two outer legs 13, a stationary end portion 14 and movable end portions 15. The outer legs 13 are distorted or crimped as indicated at 16 thereby placing the outer legs in tension and imposing a compression force upon the center leg 12, to provide the snap action. A rigid member 17, which is of T-shape as shown in Figure 1, is attached to the bimetal element, the transverse portion thereof being secured to the end portion 13 by two rivets 18 and the longitudinal portion being secured to the adjacent portion of the center leg 12 by a rivet 19. The member 17 serves to hold the fixed end 14 and the portion of the center leg 12 adjacent thereto flat and stationary, so that deflection of the bimetal element caused by temperature change effects movements of the opposite end 15.

The bimetal element is mounted on a support 21 by means of a spring member 23, which is secured to the bimetal element by the two rivets at 18 and which is also secured to an upstanding portion 22 of the support 21. The spring 23 biases the bimetal element downwardly. The member 17 is formed with a depending flange 24, and a temperature-adjusting screw 25, screw threaded in the upstanding portion 22 of the support, bears against the flange 24 in opposition to the force of the spring 23 to vary the angular position of the member 17 and the stationary end of the bimetal element.

The bimetal element carries one or more movable contacts which cooperate with one or more stationary contacts carried by the support 21. In the illustrated embodiment, two stationary contacts 26 are mounted on the support 21. Two movable contacts 27 connected by a bridging member 28, are adapted to engage the contacts 26 to complete the circuit therebetween. The bridging member 28, is provided with ears that extend through and are rockable in slots in the arms of a yoke 29, which is attached to the movable end 15 of the bimetal element 10, but is insulated therefrom in a manner well understood in the art. The stationary contacts 26 form a stop limiting the movement of the bimetal element in downward or contact closing direction.

The resilient stop for limiting the movement of the bimetal element in opening direction comprises, in this embodiment, a spring arm 31 and a set screw 32. The spring arm 31 is fastened to the support 21 by means of a screw 33. The set screw 32 is adjustable relative to the spring arm 31 and held in adjusted position by means of a nut 34.

The bimetal element 10 is constructed so that it has a relatively wide inherent temperature differential. That is, if its movement were not limited by stops, the difference between the temperature at which it snaps to the opposite position would be relatively high. However, to reduce the temperature differential, the movement of the bimetal element is limited by stops, and in order to provide for temperature adjustment, the stops are movable relative to the bimetal element. In the present embodiment, temperature adjustment of the thermostat is effected by changing the angular position of the bimetal element by means of the adjusting screw 25, thereby simultaneously adjusting the bimetal element relative to both stops and thereby adjusting both the opening and the closing temperature.

Operation

Figure 2:
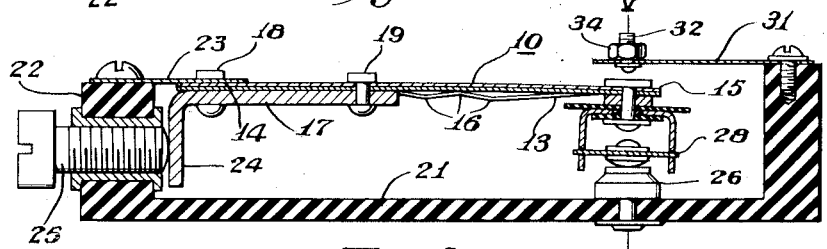
Figs. 2, 3 and 4 are longitudinal sectional views taken on the line II—II of Fig. 1, Figure 2 showing the thermostat in the closed position, Figure 3 showing the same immediately after the thermostat has snapped to the open position, and Figure 4 showing the same just ready to snap to the closed position.
Figure 3:
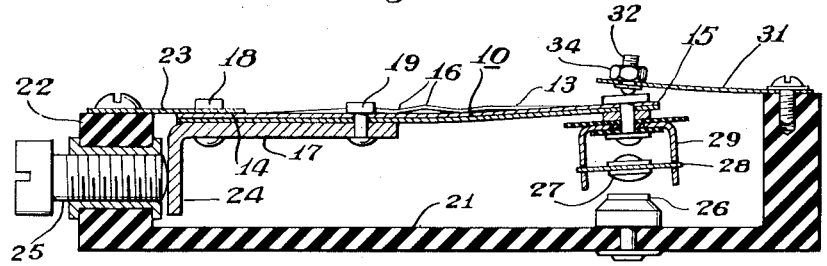

In the present embodiment, the bimetal element 10 moves downwardly to close the contacts in response to decrease in temperature, and moves upwardly in response to increase in temperature to open the contacts, the metal on the lower side having the greater coefficient of expansion. Figure 2 shows the contacts in closed position following a decrease in temperature. The resilient stop is not deflected and is spaced from the bimetal element 10. As the temperature to which the bimetal element 10 is subjected increases, as usually occurs following closing of the contacts, the metal on the lower side of the element expands at a higher rate than the metal on the upper side, thereby building up a stress to move the bimetal element upwardly. As the stress exceeds the forces resisting the same, it causes the bimetal element to bow upwardly, this taking place with a snap action. The upward stress overcomes the spring force of the spring arm 31, which is deflected as shown in Figure 3, thereby providing a wide gap between the stationary contacts 26 and the movable contacts 27, as shown in Fig. 2.

Figure 4:
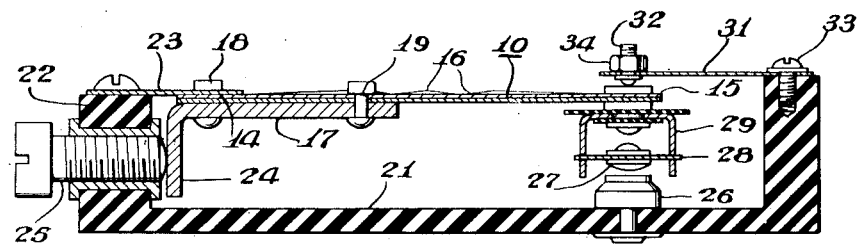
Figure 5:
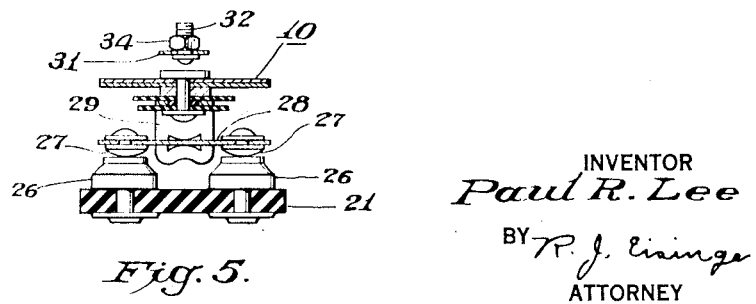
Fig. 5 is a transverse section taken on the line V—V of Fig. 2.

As the temperture imposed on the bimetal element 10 decreases, the upward stress caused by differential expansion decreases, so that the spring force of the spring arm 31 becomes effective to move the bimetal element downwardly until it reaches the position shown in Figure 4, where the gap between the contacts has been substantially reduced. In this position, the bimetal element is forced to a position near its snap-over position, so that it will snap over more readily; in other words, its closing temperature is raised. Upon further decrease in temperature, the bimetal element will again snap to closed position.

To raise or lower the temperature setting of the thermostat, the bimetal element 10 is raised or lowered, respectively, this being effected by turning the adjusting screw 25 to turn the member 17 and the bimetal element 10 angularly about the spring member 23. Since the bimetal element is similarly adjusted relative to both stops, both the opening and the closing temperatures are similarly adjusted, with the temperature differential remaining substantially the same.

The temperature differential may be varied by adjusting the set screw 32 relative to the stationary contacts or stop, the screw being moved away therefrom to increase the differential and toward the same to decrease the differential.

The resilient stop is spaced from the bimetal element when the latter is in closed position, so as not to affect the opening temperature, which is determined by the closed position stop, in this case the stationary contacts. If the resilient stop did engage the bimetal element in closed position, it would raise the opening temperature.

I have found that the best results are obtained when there is provided a spring arm 31 which has substantially the same pressure-deflection curve that the bimetal element itself has when in the open position. For example, upon testing one specific bimetal, it was found that, after it had snapped to the open position, it required 0.4 ounce increase in pressure to advance it for every one mill deflection. Accordingly, a flexible spring stop having the same characteristic, namely, 0.4 ounce change in pressure for each mill of deflection, was used and was found to give results which were excellent and which were better than obtained with a stop which is either weaker or stronger.

In one series of tests, a thermostat in accordance with the present invention and having a flexible stop, was tested. The flexible stop was then replaced by a rigid stop which was adjusted to the same position as the flexible stop in its undeflected position, as shown in Fig. 2, that is, its position when the thermostat is in closed position. For a given temperature adjustment, the opening temperature was the same, since it is determined by the contacts which constitute the closed position stop. As to the closing temperature, however, it was found that the bimetal element snapped to closed position at an earlier point in the cycle; in other words, it snapped to closed position at a higher temperature and with a larger gap between the contacts, thus providing a smaller temperature differential. This is an unexpected result, inasmuch as with a larger gap, the temperature differential would be expected to be greater. The only explanation for this action of the resilient stop that occurs to me is that possibly the inertia of movement produced by the resilient stop causes the bimetal to continue its movement towards closed position.

The present invention, therefore, for a given gap between the open position or resilient stop and the bimetal, provides greater contact separation both at the time of opening and just before closing, and also provides a smaller temperature differential. Accordingly, the present invention may be utilized to provide greater current carrying capacity. On the other hand, it may be utilized to provide a still smaller temperature differential for a given current interrupting capacity by adjusting the resilient stop towards the other stop, this being permissible since the yielding of the resilient stop provides the desired contact separation upon opening movement.

While I have shown my invention in but one form, it will be obvious to those skilled in the art that it is not so limited, but is susceptible of various changes and modifications without departing from the spirit thereof.

What I claim is:

1. A thermostat comprising a support, an inherently snap acting bimetal thermal element mounted thereon, a contact carried by a movable portion of said bimetal element, a stationary contact mounted on said support cooperating with said first contact and serving to limit the movement of said bimetal element in contact-closing direction, and resilient stop means mounted on said support in such position as to engage said bimetal element upon movement in contact-opening direction and biasing the same in contact-closing direction to raise the contact-closing temperature, said resilient stop means having substantially the same pressure-deflection characteristic that said bimetal element has when it is in contact-opening position, and the movement of said resilient stop means being limited so that it does not engage said bimetal element when the latter is in contact-closing position.

2. A snap-acting thermostat comprising a supporting structure, a snap-acting bimetallic element including a center leg and two outer legs and end portions joining the respectively adjacent ends of said legs, a rigid member attached to one end portion at two points spaced transversely of said element and to said center leg at a point spaced from both ends thereof but disposed as near to the adjacent end as to the remote end, said rigid member not being attached to the outer legs nor to the other end portion, a spring member attached to said supporting structure and to said rigid member for hingedly connecting the same and biasing the latter in one direction about the hinge provided by the spring, an adjustable member abutting against said rigid member against the bias of said spring, and a stop carried by said supporting structure on one side of said bimetal element adjacent the opposite end thereof and adapted to limit movement thereof in one direction, said adjustable member being adapted to adjust said bimetallic element relative to said stop to vary the temperature at which said bimetallic element snaps away from said stop.

3. A snap-acting thermostat comprising a supporting structure, a snap-acting bimetallic element including a center leg and two outer legs and end portions joining the respectively adjacent ends of said legs, a rigid member attached to said center leg and to one end portion but not to the outer legs nor the other end portion, a spring member attached to said supporting structure and to said rigid member for hingedly connecting the same and biasing the latter in one direction about the hinge provided by the spring, an adjustable member abutting against said rigid member against the bias of said spring, stops carried by said supporting structure adapted to abut the opposite end of said bimetal element upon movement in opposite directions, whereby the position of said bimetal element relative to both of said stops may be simultaneously adjusted to vary the temperature at which it snaps from one position to the other.

4. A thermostat comprising a support, an inherently snap acting bimetal thermal element mounted thereon, a contact carried by a movable portion of said bimetal element, a stationary contact mounted on said support cooperating with said first contact and serving to limit the movement of said bimetal element in contact-closing direction, and a resilient stop biasing said bimetal element in contact-closing direction when said element is in open position, said resilient stop having substantially the same pressure-deflection characteristic that said bimetal element has when it is in open position.

5. A thermostat as set forth in claim 4 wherein the resilient stop is not deflected and is spaced from the bimetal element when the latter is in its closed position.

6. A thermostat comprising a support, an inherently snap-acting bimetal element mounted on said support, a first and a resilient stop mounted on said support and adapted to abut opposite sides of the movable portion of said bimetal element to limit the movement thereof, the resilient stop being disposed in spaced relation to said movable portion when the latter engages the first stop, and means for adjusting said bimetal element relative to said first and resilient stops to vary the temperature setting of the thermostat without altering the relation of said first and said resilient stop to each other, whereby, at all temperature settings, said movable portion is spaced from and free of the influence of said resilient stop when it engages the first stop.

7. A thermostat as set forth in claim 6 wherein said first stop is a stationary electrical contact and said movable portion carries a cooperating movable contact adapted to engage the stationary contact upon movement of said movable portion in the direction toward said stationary contact.

8. A thermostat as set forth in claim 6 wherein said resilient stop has substantially the same pressure-deflection characteristics that said bimetal element has when it is out of engagement with the first stop.

9. A thermostat comprising a support, a bimetal temperature responsive element formed to change from one position to another with a snap action and mounted on said support, a pair of cooperating contacts, said bimetal element moving one of said contacts into engagement and disengagement with the other with a snap action, the thermostat having a stop mounted on said support for engaging the bimetal element in the contact closed position to determine the opening temperature of the thermostat, a resilient stop mounted on said support in a position to bias said bimetal element in contact closing direction when it is in open position but spaced from and exerting no bias thereon when it is in the closed position, whereby said resilient stop permits wide contact separation when the bimetal element snaps to open position and gradually moves said bimetal element toward closing position, as its stress in opening direction decreases, to determine the closing temperature of the thermostat, and means for adjusting said temperature responsive element relative to said support and said stops to thereby simultaneously vary both the opening and the closing temperature while the relation of the stops to each other remains constant and provides substantially constant temperature differential for different temperature adjustments.

10. A snap-acting thermostat comprising a supporting structure, a snap-acting bimetal element including a center leg and two outer legs and end portions joining the respective adjacent ends of said legs, a mounting member attached to one end portion at two points spaced transversely of said element and in alignment with said two outer legs respectively and also attached to said center leg at a point spaced a substantial distance from both ends thereof, said mounting member not being attached to the other end portion nor to the outer legs for a distance extending from said other end portion toward the first-mentioned end portion a substantial distance beyond said point of attachment to said center leg, a resilient or spring portion hingedly connecting said mounting member to said supporting structure and biasing said mounting member in one direction about the hinge provided by the spring portion, an adjustable member abutting said mounting member against the bias of said spring portion, and a stop carried by said supporting structure on one side of said bimetal element adjacent the opposite end thereof and adapted to limit movement thereof in one direction, said adjustable member being adapted to adjust said bimetal element relative to said stop to vary the temperature at which said bimetal element snaps away from said stop.

PAUL R. LEE.

REFERENCES CITED

The following references are of record in the file of this patent:

UNITED STATES PATENTS

| Number | Name | Date |
|---|---|---|
| 2,010,649 | Spencer | Aug. 6, 1935 |
| 2,289,095 | Bletz | July 7, 1942 |
| 2,320,873 | Lee | June 1, 1943 |
| 2,360,723 | Schaefer | Oct. 17, 1944 |
| 2,424,150 | Clark et al. | July 15, 1947 |